Aug. 28, 1923.

F. A. MILLER

PISTON OR PACKING RING

Filed Nov. 13, 1922

1,466,510

INVENTOR
FRED A. MILLER,
by Ralph Welch ATTORNEY.

Patented Aug. 28, 1923.

1,466,510

UNITED STATES PATENT OFFICE.

FRED A. MILLER, OF ST. LOUIS, MISSOURI.

PISTON OR PACKING RING.

Application filed November 13, 1922. Serial No. 600,670.

*To all whom it may concern:*

Be it known that I, FRED A. MILLER, a citizen of the United States, residing at the city of St. Louis, State of Missouri, have invented a certain new and useful Improvement in Piston or Packing Rings, of which the following is a specification, reference being had to the accompanying drawing, forming a part thereof.

My invention relates generally to piston or packing rings and, more particularly, to a certain new and useful improvement in that class of piston-rings wherein the ring functions to remove excess lubricant from the cylinder wall and carries and distributes lubricant throughout the length of the piston-stroke.

In the employment of the ordinary ring, wherein the ring bears against the cylinder sufficiently to form a leak-tight joint as required to prevent the passage of "gas" between the cylinder and piston, there is a tendency toward a too great removal of the lubricant, with the result that the cylinder becomes overheated with a consequent carbonization of the cylinder, an undesirable exhausting of smoke, and an appreciable waste of lubricant. In the relief of ring-pressure against the cylinder in an attempt to carry lubricant throughout the piston-stroke, the tendency is to destroy the intimate engagement necessary to prevent gas leakage between the cylinder and piston and around the too loose ring.

My present invention has hence for its chief object the provision of a piston-ring having ducts forming a communication between the lubricant carrying surface of the cylinder and the ring-groove of the piston, to the end that the ring may be brought and maintained in such intimacy with the cylinder as to prevent gas-leakage and further function to wipe excess lubricant from the cylinder, yet provide lubrication for the cylinder wall throughout the length of the piston-stroke.

Figure 1:
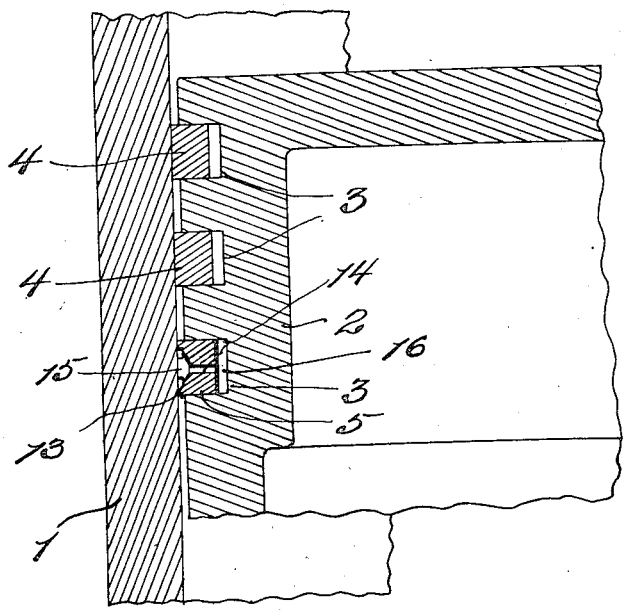
Figure 2:
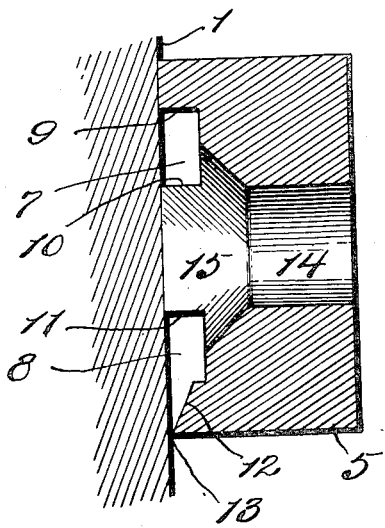
Figure 3:
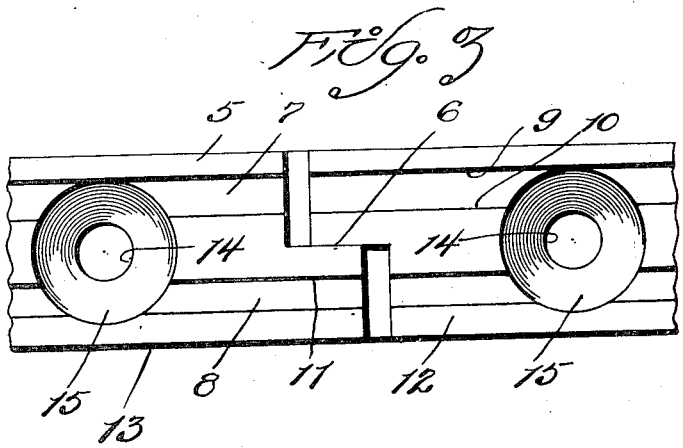

With the above and other objects in view, my invention resides in the novel form, construction, arrangement, and combination of parts hereinafter fully, clearly, and concisely described, definitely set forth in my claims, and illustrated by the accompanying drawing, in which, Figure 1 shows in vertical sectional elevation fragments of a piston and cylinder and a ring embodying my invention;

Figure 2 is an enlarged sectional elevation of the ring and a fragment of a cylinder; and Figure 3 is a fragmentary, enlarged edge view of the ring, showing the joint and spaced oil ducts.

Referring now by reference characters to the drawing, 1 designates the cylinder, 2 the piston, 3 the usual piston-grooves, and 4, 4, piston-rings preferably of common standard construction disposed in the upper grooves 3, as seen in Figure 1.

Disposed in the lowermost groove 3, which is next adjacent the crank-case or other source of oil supply, is a ring 5 of my invention. This ring 5, which is preferably of the split resilient type having a step-joint 6, as seen in Figure 3, is provided circumferentially upon its outer peripheral face and adjacent its opposite axial ends with so-called oil grooves 7 and 8, the upper wall 9 and lower wall 10 of upper groove 7 and the upper wall 11 of lower groove 8 being preferably at right angles to the outer peripheral or bearing face and to the axis of the ring. The lower wall 12 of lower groove 8, however, is preferably beveled to intersect the lower axial end of the ring, as best seen in Figure 2; the ring is thereby formed or provided with a sharp peripheral edge 13 adapted to wipe the cylinder wall on the down-stroke of the piston.

Intermediate the grooves 7, 8, the ring 5 is formed at spaced circumferential intervals with radial ports or ducts 14 of relatively minute diametrical dimension, which are open at both the inner and outer peripheral faces of the ring and thus communicate with the piston-groove 3 and with the surface of the cylinder. Each port or duct 14 is, further, counter-bored or otherwise diametrically enlarged at its outer end to flare funnelwise, as at 15, in direct communication with the base of each of the grooves 7, 8.

In use and operation, on the down-stroke of the piston toward the source of oil-supply, the excess oil will for the most part be wiped from the cylinder-wall and be directed back into the crank-case by the peripheral edge 13. On such stroke of the piston, however, some of the oil will be wiped from the cylinder wall by the groove walls 9 and 11 into the grooves 7 and 8 and to some extent flow therefrom through the ducts 14 and their flaring or funnel-shaped mouths 15 into the space 16 between the inner peripheral face of the ring 5 and the outer or base-face of the piston-groove 3. On the up-stroke of the piston, some of such retained lubricant will flow from the ducts 14 back into the grooves 7, 8, and against the cylinder wall and thus provide for efficient lubrication between the cylinder and the piston on its next succeeding strokes, the lubricant remaining in the space 16 functioning as a seal, as it may be said, against the flow or escape of any combustible gases around the ring or between the ring and the piston.

I am aware that changes in the form, construction, arrangement, and combination of the several parts of my new ring may be made and substituted for those herein shown and described without departing from the nature and principle of my invention.

Having thus described my invention, what I claim and desire to secure by Letters Patent is:

1. A split resilient piston-ring having a pair of spaced circumferential grooves upon its outer peripheral face, and a series of circumferentially spaced radial ducts intermediate the grooves, said ducts being open to both said grooves and to the inner peripheral face of the ring.

2. A split resilient piston-ring having a pair of spaced circumferential grooves upon its outer peripheral face, and a series of circumferentially spaced radial ducts intermediate the grooves, said ducts being open at one end to the inner peripheral face of the ring and being diametrically enlarged at their other end for communication with both said grooves.

3. A split resilient piston-ring having a pair of spaced circumferential grooves upon its outer peripheral face, and a series of circumferentially spaced radial ducts intermediate the grooves, said ducts being open at one end to the inner peripheral face of the ring and having funnel-shaped mouths at their other end communicating with the base of both said grooves.

4. In combination with a cylinder and a piston movable in the cylinder, the piston having a circumferential groove, of a split ring resiliently fitting in said groove, said ring having a pair of spaced circumferential grooves upon its outer peripheral faces having sharp-corner walls adapted to wipe the wall of the cylinder, and a series of circumferentially spaced ducts intermediate said peripheral grooves, said ducts communicating at one end with the piston-groove and at their other end with both said peripheral grooves.

In testimony whereof, I have signed my name to this specification.

FRED A. MILLER.